(12) United States Patent
Sutton et al.

(10) Patent No.: US 7,691,305 B2
(45) Date of Patent: Apr. 6, 2010

(54) ARTICLES COMPRISING A FIBER-REINFORCED THERMOPLASTIC POLYMER COMPOSITION

(75) Inventors: Tonja R. Sutton, Midland, MI (US); Joanna G. Richardson, Midland, MI (US)

(73) Assignee: Dow Global Technologies, Inc., Midland, MI (US)

( * ) Notice: Subject to any disclaimer, the term of this patent is extended or adjusted under 35 U.S.C. 154(b) by 1343 days.

(21) Appl. No.: 10/527,567

(22) PCT Filed: Sep. 26, 2003

(86) PCT No.: PCT/US03/30267

§ 371 (c)(1),
(2), (4) Date: Mar. 11, 2005

(87) PCT Pub. No.: WO2004/035295

PCT Pub. Date: Apr. 29, 2004

(65) Prior Publication Data

US 2006/0049541 A1    Mar. 9, 2006

Related U.S. Application Data

(60) Provisional application No. 60/418,937, filed on Oct. 15, 2002.

(51) Int. Cl.
*B29B 11/04* (2006.01)
(52) U.S. Cl. .................................. 264/211; 264/148
(58) Field of Classification Search .............. 264/211, 264/148
See application file for complete search history.

(56) References Cited

U.S. PATENT DOCUMENTS

| | | | |
|---|---|---|---|
| 3,236,917 A | 2/1966 | Natta et al. | 260/878 |
| 3,645,992 A | 2/1972 | Elston | 260/80.78 |
| 4,439,387 A | 3/1984 | Hawley | 264/108 |
| 4,701,432 A | 10/1987 | Welborn, Jr. | 502/113 |
| 4,905,541 A | 3/1990 | Alan | 74/608 |
| 4,935,397 A | 6/1990 | Chang | 502/117 |
| 4,937,299 A | 6/1990 | Ewen et al. | 526/119 |
| 4,937,301 A | 6/1990 | Chang | 526/128 |
| 5,055,438 A | 10/1991 | Canich | 501/117 |
| 5,194,506 A | 3/1993 | Efner et al. | 525/166 |
| 5,272,236 A | 12/1993 | Lai et al. | 526/348.5 |
| 5,278,272 A | 1/1994 | Lai et al. | 526/348.5 |
| 5,391,618 A | 2/1995 | Yamamoto et al. | 525/88 |
| 5,401,154 A * | 3/1995 | Sargent | 425/114 |
| 5,424,020 A * | 6/1995 | Hara et al. | 264/257 |
| 5,576,374 A * | 11/1996 | Betso et al. | 524/451 |
| 5,639,829 A | 6/1997 | Yamaguchi et al. | 525/240 |
| 5,773,155 A * | 6/1998 | Kale et al. | 428/523 |

(Continued)

FOREIGN PATENT DOCUMENTS

EP    129368    6/1984

(Continued)

*Primary Examiner*—Jeff Aftergut
*Assistant Examiner*—Jaeyun Lee

(57) ABSTRACT

A method for making a fiber-reinforced thermoplastic polymer composition and forming a fabricated article therefrom. A thermoplastic polymer, a masterbatch comprising an elastomer and a reinforcing fiber material are compounded, extruded and immediately formed into a fabricated article. The fabricated article is formed by compression molding, vacuum forming, thermoforming, injection molding, blow molding, profile extrusion or combinations thereof.

11 Claims, 6 Drawing Sheets

U.S. PATENT DOCUMENTS

| | | | |
|---|---|---|---|
| 5,798,128 A | 8/1998 | Dumazet et al. | 425/147 |
| 6,238,733 B1 | 5/2001 | Therolf | 427/209 |
| 6,419,864 B1 * | 7/2002 | Scheuring et al. | 264/102 |
| 6,444,153 B1 | 9/2002 | Shah et al. | 264/211.21 |

FOREIGN PATENT DOCUMENTS

| | | |
|---|---|---|
| EP | 260999 | 9/1987 |
| EP | 1008434 | 12/1999 |
| WO | 90/07526 | 7/1990 |
| WO | WO99/64241 * | 12/1999 |
| WO | WO 0243943 A1 * | 6/2002 |

* cited by examiner

ARTICLES COMPRISING A FIBER-REINFORCED THERMOPLASTIC POLYMER COMPOSITION

CROSS-REFERENCE TO RELATED APPLICATION

This application is filed pursuant to 35 USC 371 based upon PCT/US03/30267, filed Sep. 26, 2003, which claims the benefit of U.S. Application No. 60/418,937, filed Oct. 15, 2002.

This invention relates to a method to make a fiber-reinforced thermoplastic polymer composition comprising an elastomer and fabricated articles therefrom.

Molded articles comprising thermoplastic polymers, in particularly propylene polymers, find wide use in a large variety of applications, for example fabricated articles in automobiles, home appliances, electronic housing, furniture, floor coverings and wall coverings.

Physical property requirements for such articles are varied and application dependent. It is well-known to this art that thermoplastic polymers can contain non-polymeric materials as fillers, in order to alter certain of their properties. Thus, various mineral or inorganic fillers can be used in order to change one or more mechanical property of a thermoplastic polymers, such as coefficient of linear thermal expansion; modulus; impact strength, especially low temperature impact strength; tensile strength; flexural strength and resilience.

The process of forming a sheet of reinforced thermoplastic material, such as glass fiber-reinforced polypropylene, is well known. For example, the U.S. Pat. No. 4,439,387 shows a method of manufacturing a composite reinforcing structure by extruding fluid thermoplastic resin through an elongated die simultaneously with introducing a plurality of continuous fiber reinforcing strands into the die. However, the resulting composite demonstrates anisotropic mechanical properties. Improved performance is achieved by adding randomly oriented fibers and/or additional fillers.

Typically, molders of fabricated articles formed of reinforced thermoplastic material purchase the material from a manufacturer in a desired preform such as a sheet or a mat. The mat can be formed of glass fibers and layered in a thermoplastic resin such as polypropylene. The molder reheats the preform before inserting it into a molding machine to compression mold the desired part. However, such a procedure has many disadvantages including the inability to quickly change material composition and preform shape when required.

A method to compound a reinforced thermoplastic material in a continuous process, but limited to compression molded articles in taught in U.S. Pat. No. 5,401,154. However, the process is not cost effective as it runs at low output rates and requires interchangeable screw configurations to allow for selective control of different material properties.

It is known that to overcome inadequate impact resistance, rubbery elastic materials such as ethylene-propylene copolymer rubber, ethylene-propylene-diene copolymer rubber, or ethylene-butene copolymer rubber have been blended with propylene polymers. For example, see U.S. Pat. No. 5,391,618 which discloses low crystalline polypropylene polymer compositions comprising an ethylene alpha-olefin copolymer, U.S. Pat. No. 5,576,374, which discloses polypropylene polymer compositions comprising a substantially linear ethylene polymer and U.S. Pat. No. 5,639,829 which discloses propylene polymer compositions comprising an ethylene and 1-butene random copolymer. However, while impact properties are improved fabricated articles from these propylene polymer compositions do not demonstrate a good balance of stiffness and toughness.

Additionally, other thermoplastic polymer properties, for example ultra violet light stability, thermal stability, color, thermoplastic polymer and fiber compatibility, flammability, and coefficient of thermal expansion may be inadequate for specific applications. One or more additional additives may be needed resulting in a complex and costly storage and handling operation requiring additional and expensive equipment for the manufacturing process.

In view of the deficiencies of the conventional thermoplastic polymer compositions and methods to mold fabricated articles therefrom, it would be highly desirable to provide a thermoplastic polymer composition and a cost effective method to mold fabricated articles therefrom, said articles having a good balance of stiffness and toughness.

The present invention is such a desirable thermoplastic polymer composition and method. The present invention provides a cost-effective method to make a fiber reinforces thermoplastic polymer composition, and fabricated articles therefrom, having a good balance of stiffness and toughness.

In one embodiment, the present invention relates to a method for making a fiber-reinforced thermoplastic polymer composition comprising the steps of introducing into an extruder a thermoplastic polymer and a masterbatch comprising an elastomer, plasticating the thermoplastic polymer and masterbatch in the extruder forming a molten thermoplastic polymer composition, introducing a continuous reinforcing fiber material into the molten thermoplastic polymer composition, extruding a molten fiber-reinforced thermoplastic polymer composition and forming a fabricated article comprising the fiber-reinforced thermoplastic polymer composition.

In a preferred embodiment, the present invention is a method for making the fiber-reinforced thermoplastic polymer composition and fabricated article therefrom described hereinabove further comprising the steps of extruding the molten fiber-reinforced thermoplastic polymer composition through a die forming a continuous extrusion of heated fiber-reinforced thermoplastic polymer composition having a desired cross-sectional shape, conveying the continuous extrusion of heated fiber-reinforced thermoplastic polymer composition to a cutter, cutting the continuous extrusion into a plurality of preforms, and conveying the preforms away from said cutter into a vacuum-forming mold or thermoforming mold, preferably a compression mold.

Another preferred embodiment of the present invention is a method for making a fiber-reinforced thermoplastic polymer composition and fabricated article described hereinabove further comprising the steps of conveying the molten fiber-reinforced thermoplastic polymer composition to a accumulator, accumulating a desired amount of heated fiber-reinforced thermoplastic polymer composition forming a shot and injecting the shot into an injection mold.

Another preferred embodiment of the present invention is a method for making a fiber-reinforced thermoplastic polymer composition and fabricated article described hereinabove further comprising the steps of extruding the molten fiber-reinforced thermoplastic polymer through a die forming a parison, placing the parison in a blow mold, closing the mold, and injecting a gas into the mold.

Another preferred embodiment of the present invention is a method for making a fiber-reinforced thermoplastic polymer composition and fabricated article therefrom described hereinabove further comprising the step of extruding the molten fiber-reinforced thermoplastic polymer composition through an extrusion profile die having a desired shape.

In yet another embodiment of the present invention, a preferred reinforcing fiber is a plurality of continuous glass fibers, and a preferred elastomer is a substantially linear ethylene polymer comprising ethylene and 1-octene.

The fiber-reinforced thermoplastic polymer compositions of the present invention are especially useful in the preparation of fabricated articles having large surface areas requiring a good balance of stiffness and impact resistance properties, ductility, tensile strength, surface aesthetics, and weatherability. Such properties are particularly desirable for fabricated articles for use in vehicle applications. Vehicles include, but are not limited to, automobiles (car and truck), buses, trains, subway cars, snow mobiles, personal water crafts, all terrain vehicles, lawn and garden tractors, farm equipment, planes, boats and golf carts. Vehicle applications include, but are not limited to, instrument panels, door panels, front end carriers, underbodies, underbody protection, step pads, tail gates, cowlings, fenders, panels, body covers, and bed liners. Other applications include electrical and electrical equipment device housings and covers; as well as other household and personal articles such as crates; lawn and garden furniture; and building and construction floor and wall coverings. Further, the method of the present invention improves cost competitiveness by reducing the number of raw material feeds into the extruders, eliminating additional feeders, reducing metering errors while adding components, allowing for flexibility at the press to tailor impact performance to meet specific application needs, reducing inventory space, eliminating the extra step of reheating a reinforced thermoplastic preform prior to forming a fabricated article or combinations thereof.

Figure 1:
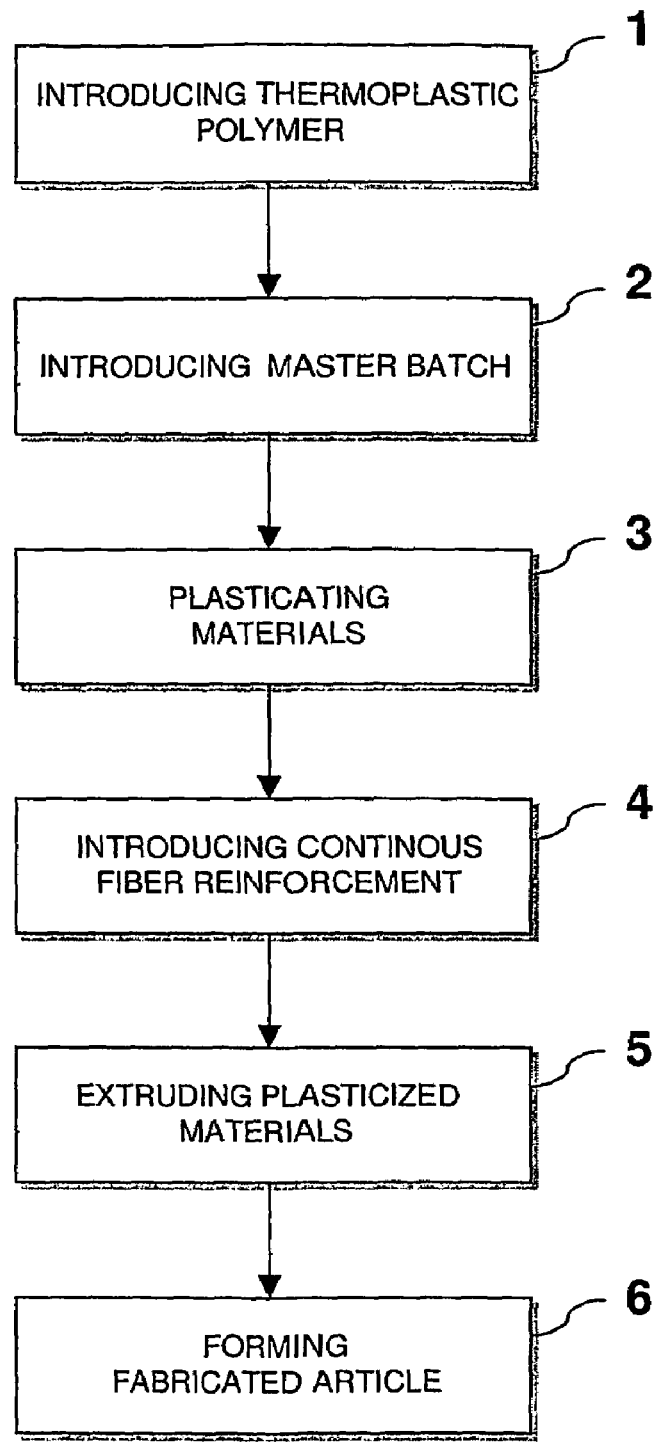
FIG. 1 is a flow chart illustrating the method steps of the present invention.
Figure 2:
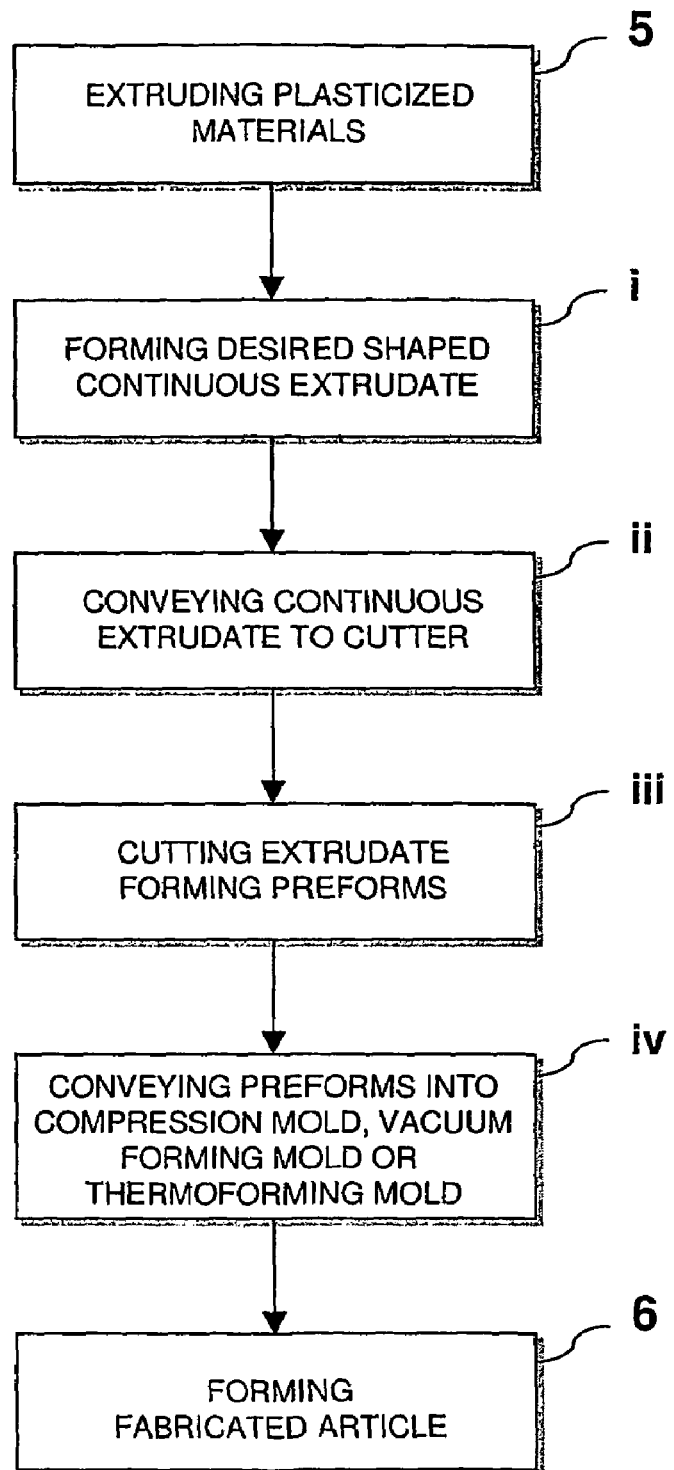
FIG. 2 is a flow chart illustrating the method steps of the present invention providing compression molded, thermoformed or vacuum formed fabricated articles.
Figure 3:
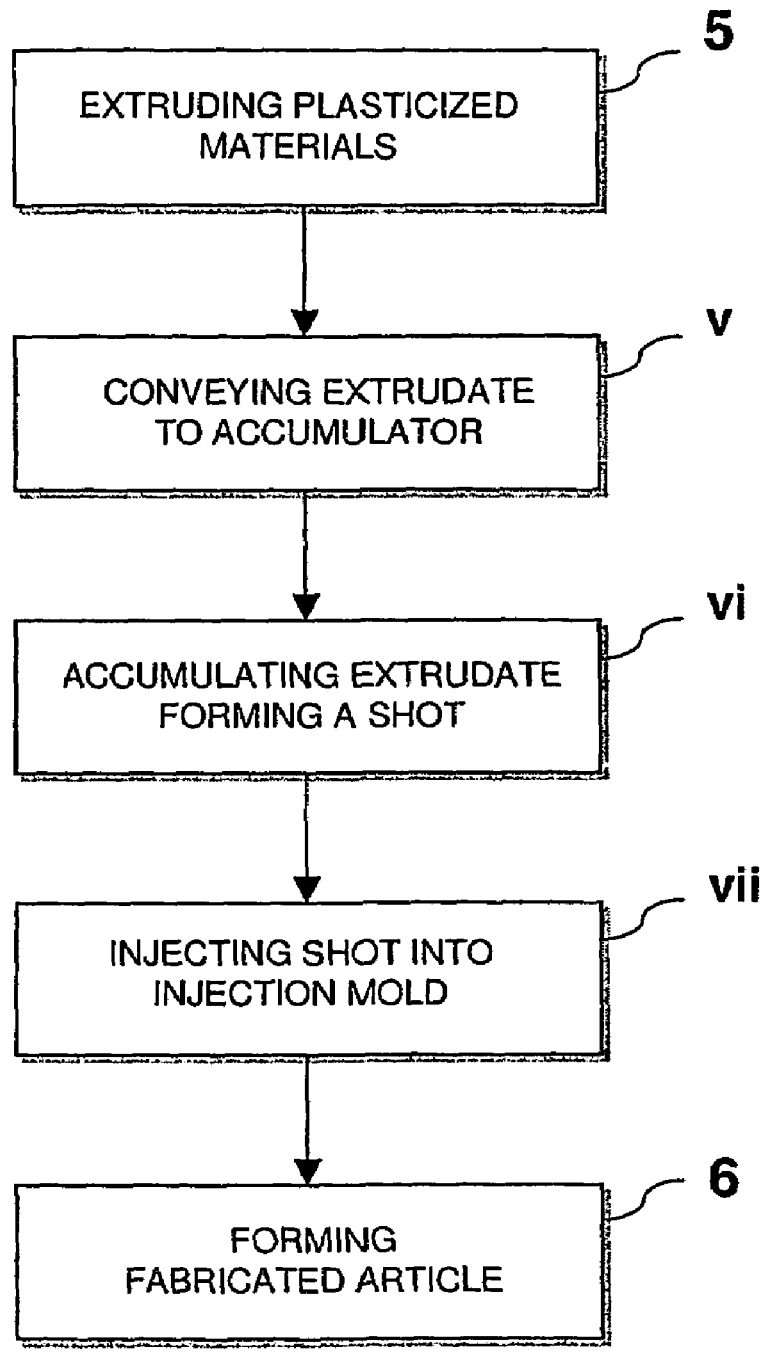
FIG. 3 is a flow chart illustrating the method steps of the present invention providing injection molded fabricated articles.
Figure 4:
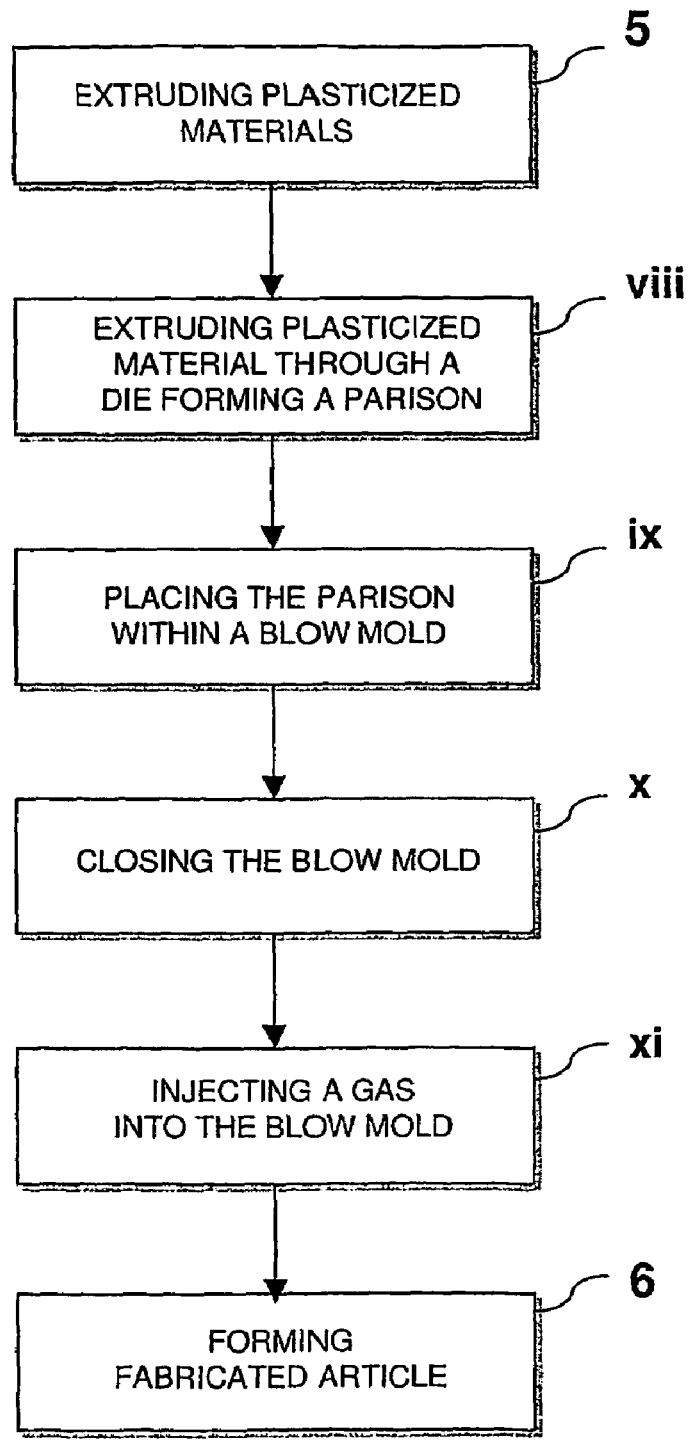
FIG. 4 is a flow chart illustrating the method steps of the present invention providing blow molded fabricated articles.
Figure 5:
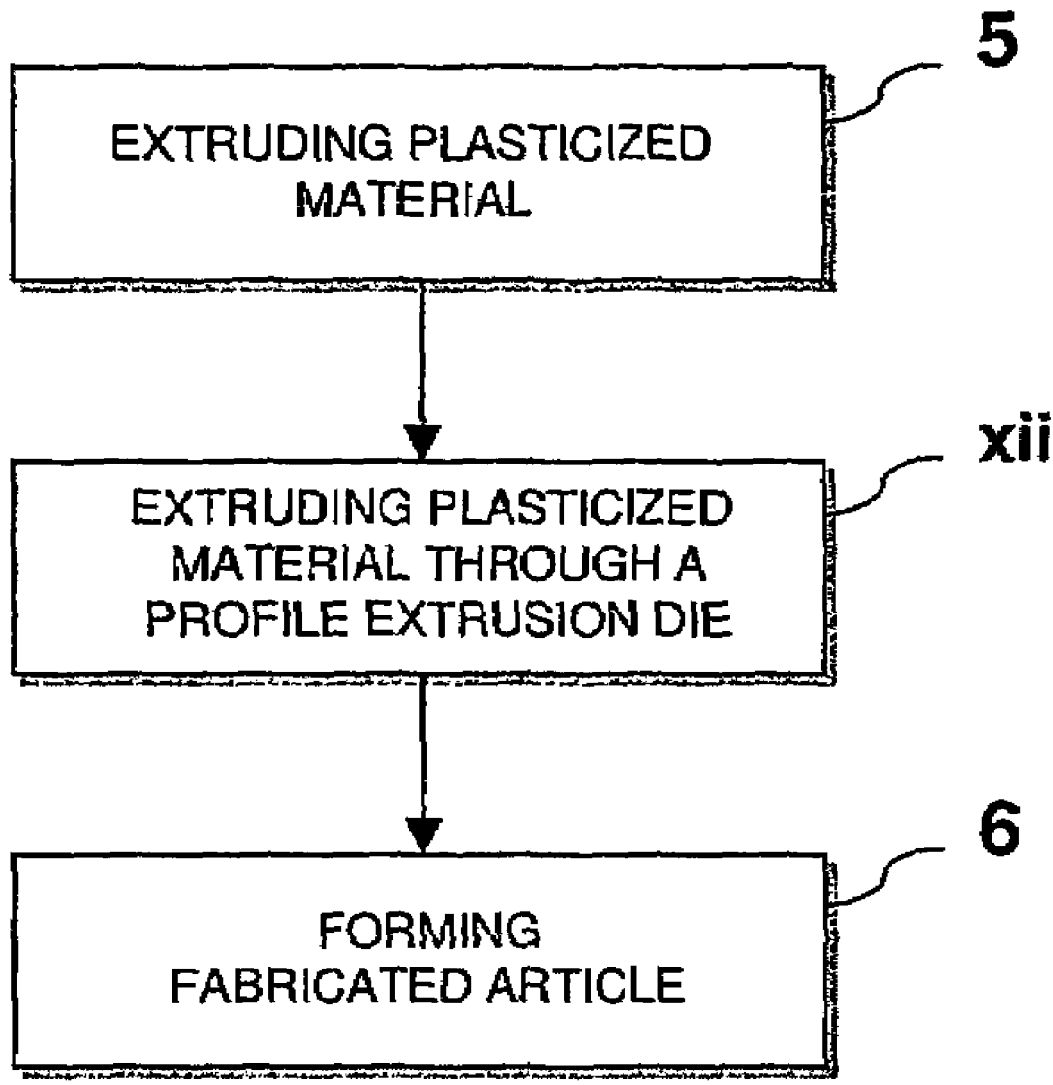
FIG. 5 is a flow chart illustrating the method steps of the present invention providing extruded profile fabricated articles.

FIG. 1 shows the steps of the method of the present invention. The present invention is a method to form fabricated articles comprising a fiber-reinforced thermoplastic polymer composition. The method comprises at least one of a compression molding, a thermoforming or vacuum forming step (FIG. 2), an injection molding step (FIG. 3), a blow molding step (FIG. 4), a profile extrusion step (FIG. 5) or combinations thereof. When using glass as the fiber reinforcing material, the method is sometimes referred to as the long glass fiber (LGF) direct process, for example, LGF direct compression molding process or LGF direct injection molding process.

Apparatus suitable for carrying out the method of the present invention are known in the art. For examples see U.S. Pat. Nos. 5,401,154; 5,798,128; 6,444,153 and 6,238,733.

Figure 6:
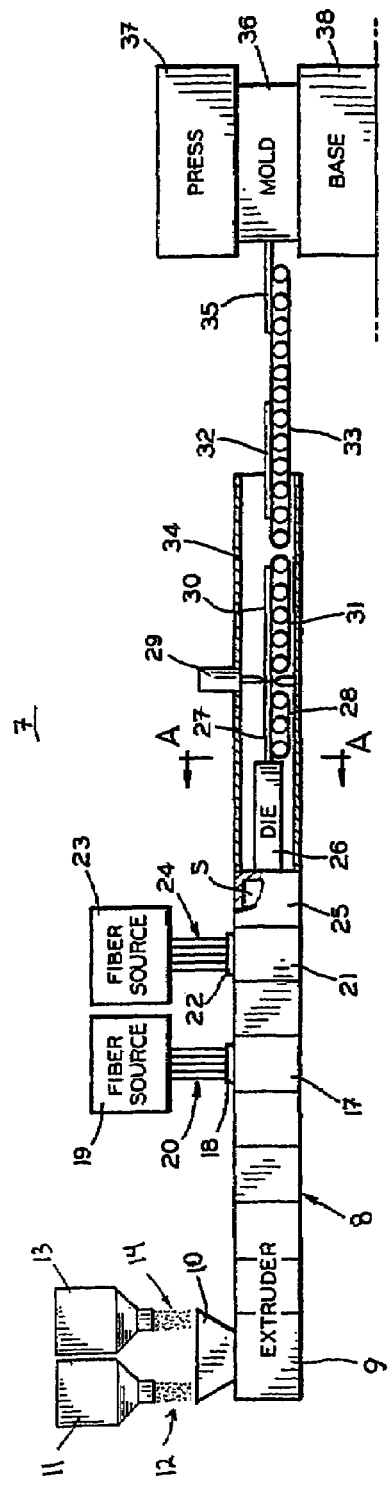
FIG. 6 is a schematic side elevation view of an apparatus for manufacturing and forming fabricated articles of fiber-reinforced thermoplastic polymer composition in accordance with the present invention.

For example, there is shown in FIG. 6 an apparatus 7 for continuously compounding a fiber-reinforced thermoplastic polymer composition, extruding the material through a die having a specific shape, typically, but not necessarily rectangular, forming a continuous extrudate with a specific shape. For instance, the continuous extrudate can be in the shape of a ribbon if the die produces rectangular extrudate. Preforms are cut from the ribbon and immediately formed into fabricated articles from the still-heated preform. The shape, width and thickness of the extrudate is not limited but is determined by several factors including the type of extruder, its size, its capacity, and the shape of the extruder die. The preforms cut from the continuous extrudate are cut to any desired length depending on the article being formed from them and the cut preforms are referred to by a variety of names, commonly they are called sheets, logs, or charges, to name a few. Typically, an extrudate and/or preform cut therefrom can be from 6 inches (15.24 centimeters) to 60 inches (152.40 centimeters) wide, preferably from 12 inches (30.48 centimeters) to 48 inches (121.92 centimeters) wide and more preferably from 12 inches (30.48 centimeters) to 36 inches (91.44 centimeters) wide. Typically, the extrudate and/or the preform cut therefrom is from 0.125 inch (0.32 centimeter) to 12 inches (30.48 centimeters) thick, preferably from 0.125 inch (0.32 centimeter) to 8 inches (20.32 centimeters) thick, more preferably 0.5 inch (1.27 centimeters) to 6 inches (15.24 centimeters) thick, even more preferably from 1 inch (2.54 centimeters) to 6 inches (15.24 centimeters) thick and most preferably from 2 inches (5.08 centimeters) to 5 inches (12.70 centimeters) thick.

The apparatus 7 includes a multi-section barrel, a compounding extruder 8, comprising a single screw, preferably a twin-screw, which has a barrel section one 9 positioned at an inlet end thereof with a raw material inlet 10. A thermoplastic polymer source 11 supplies thermoplastic polymer 12, such as polypropylene, to the inlet 10. A masterbatch source 13 supplies a masterbatch 14 comprising an elastomer, such as a substantially linear ethylene polymer and other additives, such as colorants, stabilizers and/or coupling agents, to the inlet 10. If any of the raw material(s) is(are) hygroscopic, a dryer may be required to remove moisture before the material(s) enter the inlet 10. The extruder 8 includes several intermediate sections which can be enclosed, or can have a material inlet at the top or side thereof. For example, a barrel section six 17 has a first top inlet 18 adjacent a fiber source 19 for feeding a plurality of a first reinforcing fibers 20, such as continuous glass fibers, into the molten thermoplastic polymer composition in the barrel. The extruder 8 also can optionally include one or more additional intermediate inlet sections such as a barrel section eight 21 having a second top inlet 22 adjacent a fiber source 23 for feeding a plurality of a second reinforcing fibers 24 into the molten thermoplastic polymer composition. A second fiber source may be required when it is desired to utilize fibers with different characteristics such as material, diameter or length. As explained below, the fibers 20 and 24 are preferably mixed with the molten thermoplastic polymer composition as randomly oriented reinforcing fibers which can have any desired length. A barrel section nine 25 is positioned at an outlet end of the extruder 8 for discharging the molten thermoplastic polymer composition having reinforcing fibers added thereto. Thus, the number and type of sections which form the extruder 8 can be selected to suit the thermoplastic material and fibers being processed. Furthermore, the discharge end of the extruder 8 can include a material accumulator. For example, if the extruder screw does not extend into the barrel section nine 25, an interior cavity S of that section provides a space for accumulating a quantity of the molten fiber-reinforced thermoplastic polymer composition. Additional barrel sections can be inserted between the sections 21 and 25 to increase the capacity of the accumulator cavity S.

The barrel section nine 25 has an outlet opening (not shown) connected to an inlet of a die 26 for feeding molten thermoplastic polymer composition containing reinforcing fibers into the die to be extruded into a desired shape. There exits, from an outlet of the die 26, a continuous extrusion of a predetermined cross-sectional shape, such as a ribbon 27, of fiber-reinforced thermoplastic polymer composition. As shown in the FIG. 6, the ribbon 27 has a generally rectangular cross section of predetermined thickness and width, however, depending on the application the ribbon 27 may have a cross-section of varying thickness and/or width. The ribbon 27 is supported by a ribbon conveyor 28 running at a predetermined speed. The conveyor 28 delivers the ribbon 27 to a cutter device 29 which severs the ribbon in a direction transverse to the direction of travel to form individual preforms of the thermoplastic reinforced polymer composition such as a sheet 30. The sheet 30 is supported on a first sheet conveyor 31 which is driven at the same speed as the ribbon conveyor 28. The first sheet conveyor 31 will transport the sheets cut from the ribbon 27, such as a preceding sheet 32, to a second sheet conveyor 33 which is driven at a faster speed to separate the sheets 30 and 32. Any other method of transporting the sheet from the cutter to the mold, such as manually or by robotics, or the like or any combination including the use of a conveyer and/or manually and/or robotics, is within the scope of the present invention.

Optionally, the die 26, the conveyors 28 and 31, a portion of the cutter 29 and at least a portion to all of the conveyor 33 are surrounded by a temperature control enclosure 34 which maintains the sheets at a molding temperature. A sheet 35, preceding the sheet 32 on the conveyor 33, is shown entering a mold 36. The mold 36 is a compression type mold actuated by a press 37 supported on a base 38. A fabricated article is formed by compression molding sheet 35. Alternatively, the mold 36 is a vacuum forming type mold or a thermoforming type mold wherein the press 37 and base 38 perform the required functions for vacuum forming or thermoforming fabricated articles. Depending on the article formed, one or more preforms may be placed in the mold for each molding cycle. For example, the article being formed may require one to six preforms, preferably one to four preforms or more preferably one to three preforms to be placed in the mold each molding cycle. If multiple preforms are used, they may all be the same size and shape, all different sizes and shapes, or a combination thereof.

Optionally, the ribbon 27 is supported by the ribbon conveyor 28 is delivered to a cutter device 29. After a predetermined amount of ribbon is on the conveyor the extruder is shut off, the conveyor stops and the ribbon is cut to form a sheet 30. The extruder and conveyor restart and the sheet 30 is conveyed to the mold and the process repeats.

Typically, a bundle of fibers is formed of a plurality of monofilament fibers converged into a thread and a plurality of these threads converged into a bundle for shipment to a customer. Since the monofilaments and the threads can be twisted, distorted and wound about one another, the bundle must be spread by any suitable means in order to distribute the fibers throughout the molten thermoplastic polymer composition. In the alternative, the fiber source 19 could be a supply of chopped fibers which are fed into the inlet 18 in a manner similar to the thermoplastic polymer 12. The fiber source 23 and any additional fiber source feeding into the extruder 8 can be of a similar construction.

Figure 7:
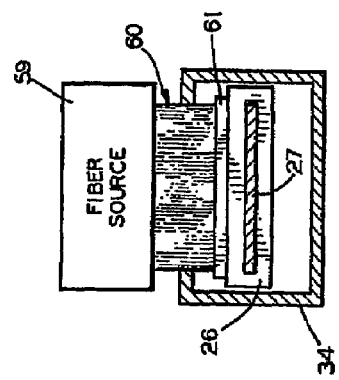
FIG. 7 is a cross-sectional view of the die and enclosure taken along the line A-A in FIG. 6 and incorporating an additional fiber source.

There is shown in the FIG. 7, a cross-sectional view of the die 26 and enclosure 34 shown in the FIG. 6. The die 26 forms the molten thermoplastic polymer composition into the ribbon 27 having a predetermined thickness and a predetermined width. If it is desired to add unidirectional reinforcing fibers to the molten thermoplastic polymer composition, preferably the fiber source is located downstream of the extruder 8 since the unidirectional fibers are continuous and extend in the direction of the longitudinal axis of the ribbon 27. As shown in the FIG. 7 a fiber source 59 is located above the die 26. A plurality of monofilament reinforcing fibers 60 are fed from the fiber source 59 into an inlet 61 in the top of the die 26. The fiber source 59 can be any suitable device for feeding a plurality of monofilaments spread across the width of the ribbon 27 such as the fiber source 19 turned transverse to the path of travel of the ribbon 27.

Preferably, the die 26 is a relatively long low pressure die which draws resin to the surface of the molten material exiting the extruder. This resin rich surface creates a class A textured surface. As stated above, the die forms a continuous extrusion of any desired cross-sectional shape.

The apparatus can comprise one or more extruders, see U.S. Pat. No. 6,238,733. For example, when two extruders are used, a first extruder plasticates the thermoplastic polymer component and the masterbatch comprising an elastomer to form a molten thermoplastic polymer composition. The molten thermoplastic polymer composition is fed into a second extruder where a fiber reinforcing material, preferably a continuous fiber material, is introduced and coated with the molten thermoplastic polymer composition. In the second extruder, when a continuous fiber material is used, the coated continuous reinforcing fibers remain continuous, or preferably, they are chopped to a desired range of lengths. The molten fiber-reinforced thermoplastic polymer composition is extruded by the second extruder through a die forming an extrudate with a desired shape, such as a ribbon. The ribbon is conveyed to a cutter, cut into a preform, such as a sheet, of desired dimensions. The sheet is conveyed to a compression mold, vacuum-forming mold or a thermoforming mold by a handling means. The material is compression molded, vacuum formed or thermoformed into a fabricated article, cooled and removed from the mold. Alternatively, a third extruder may be used. A second thermoplastic polymeric material, for example a recycled thermoplastic polymer which may be the same or different as the first thermoplastic polymer introduced into the first extruder, is fed and plasticized in the third extruder forming a second molten thermoplastic polymer composition which is introduced into the second extruder along with the first molten thermoplastic polymer composition from the first extruder and a continuous fiber reinforcing material. The process then proceeds as described hereinabove.

When more than one extruder is used, one of the extruders may be an injection molding machine. In the LGF direct injection molding process, the injection molding machine may have one or more accumulators. For instance, in a semi-continuous process, an extruder can convey extrudate to an accumulator, when the accumulator is full, extrusion is momentarily stopped by a shut off means and the accumulated extrudate, sometimes referred to as a shot, is injected, commonly by a plunger, into a cavity of an injection mold. Alternatively, in a continuous process, the injection molding machine may have two or more accumulators wherein each accumulator is alternatively filled and injected into a cavity of an injection mold, preferably, a first accumulator is filling while the shot in a second accumulator is being injected into the injection mold cavity, then the shot in the just filled first accumulator is injected into an injection mold cavity while the second accumulator is filling and the process is repeated. The mold for each accumulator may be the same or different. Multiple injection molds may be used, for example when two accumulators are used, each may have its own injection mold forming the same or different fabricated articles.

Alternatively, the method of the present invention can be used to form a blow-molded fabricated article. The molten fiber-reinforced thermoplastic polymer composition is extruded through a die forming a tube-shaped parison of any desired shape and size, typically the die forms an elliptical- or circular-shaped parison. Next, the parison is placed within an open shaping blow mold, the mold is closed and a gas, preferably air, nitrogen or carbon dioxide, is blown into the mold so as to shape the parison according to the profile of the mold, yielding a hollow molded fabricated article.

Further, the method of the present invention can be used to form continuous profile extrusions. The molten fiber-reinforced thermoplastic polymer composition is extruded through a profile extrusion die having a desired shape to form an extruded profile.

The method of the present invention can be used to process virgin materials or to process mixtures containing recycled thermoplastic polymers, recycled fiber-reinforced thermoplastic polymer compositions, or combinations thereof. An example of a two-extruder apparatus capable of incorporating recycle into a fiber-reinforced thermoplastic polymer composition is disclosed in EP 1008434.

The fiber content of the fiber-reinforced thermoplastic polymer composition of the present invention comprises from 0 to 100 percent random fibers and from 100 to 0 percent unidirectional fibers, alternatively, from 50 to 100 percent random fibers and 0 to 50 percent unidirectional fibers. The process of compounding the thermoplastic polymer composition according to the present invention is the same for random fibers and unidirectional fibers. As explained above, the difference will be in the downstream equipment incorporating the unidirectional fibers with the random fibers added in the extruder.

The process according to the present invention combines reinforcing fibers, a thermoplastic polymer and a masterbatch comprising an elastomer in such a way that the resulting fabricated products demonstrate a good surface finish and a good balance of strength, stiffness, toughness, ductility and impact resistance properties.

A preferred embodiment of the present invention utilizes a co-rotating twin-screw extruder, preferably a vented twin-screw extruder. The twin-screw extruder is used to introduce long strand reinforcing fibers into a thermoplastic resin. Depending on screw design, random fiber lengths from $1/32$ inch (0.08 centimeter) to continuous can be used. The reinforcing fibers are introduced into the twin-screw extruder at a point downstream of the inlet point for the thermoplastic polymer and masterbatch, so that the thermoplastic polymer and masterbatch are compounded, in other words, mechanically worked, blended and heated, before coming into contact with the reinforcing fibers. Preferably, the extrudate from the twin-screw extruder consists of a homogeneous, molten mass of thermoplastic polymer composition having fibers randomly dispersed within. The molten fiber-reinforced thermoplastic polymer composition is then introduced into secondary equipment such as a die to determine the size, weight and shape of the extrudate and/or preforms being made. Unidirectional reinforcing fibers can be introduced in the die.

Of course the physical properties of the fiber-reinforced material also depend upon the thermoplastic polymer and elastomer selected as well as the fiber content. In general, the reinforcing fiber is employed in an amount equal to or greater than 5 parts by weight, preferably equal to or greater than 10 parts by weight, more preferably equal to or greater than 15 parts by weight, even more preferably equal to or greater than 20 parts by weight, most preferably equal to or greater than 25 parts by weight based on the weight of the fiber-reinforced thermoplastic polymer composition. Typically the reinforcing fiber is employed in an amount equal to or less than 80 parts by weight, preferably equal to or less than 60 parts by weight, more preferably equal to or less than 45 parts by weight and most preferably equal to or less than 35 parts by weight based on the weight of the fiber-reinforced thermoplastic polymer composition. With the process according to the present invention, the reinforcing fiber percentage can be varied immediately to achieve the required physical properties of the fabricated articles to be formed.

A preferred glass fiber reinforcing material before extrusion is in the form of a continuous glass roving. Rovings comprise many fibers. Typical rovings are about 1,000M long having tex values representing its weight. Preferably the tex value for the glass roving is equal to or greater than 500, more preferably equal to or greater than 1,000 and most preferably equal to and greater than 2,000. Preferably the tex value for the glass roving is equal to or less than 10,000, more preferably equal to or less than 5,000 and most preferably equal to or less than 3,000. Preferred glass fibers have a diameter equal to or greater than 3 microns, more preferably equal to or greater than 5 microns and most preferably equal to or greater than 10 microns. Preferred glass fibers have a diameter equal to or less than 40 microns, more preferably equal to or less than 30 microns and most preferably equal to or less than 20 microns. After the process of the present invention, the glass fibers in the fabricated article have a length equal to or greater than 0.01 inch (0.03 centimeter), more preferably equal to or greater than 0.1 inch (0.25 centimeter) and most preferably equal to or greater than 1 inch (2.54 centimeters). After the process of the present invention, the glass fibers in the fabricated article have a length equal to or less than the length of the fabricated article, preferably equal to or less than 10 inches (25.40 centimeters), more preferably equal to or less than 6 inches (15.24 centimeters), even more preferably equal to or less than 4 inches (10.16 centimeters) and most preferably equal to or less than 2 inches (5.08 centimeters).

Although an example utilizing continuous glass fibers and polypropylene resin has been discussed, discontinuous glass fibers are also suitable for the present invention. Other continuous and discontinuous fibers such as carbon graphite fibers, polyester fiber (for example KEVLAR™ polyaramid fibers from DuPont), metal fibers and metal-coated fibers are suitable, as well as natural fibers, such as hemp fibers. Coatings, sizings, and/or coupling agents which improve adhesion between fibers and the thermoplastic polymers, are well known. Suitable coatings, sizings, and/or coupling agents may be employed in typical amounts for the thermoplastic polymer and reinforcing fiber selected in the method of the present invention.

Thermoplastic polymer means any polymer that can be repeatedly melted and solidified by heating and cooling. The thermoplastic polymer component in the fiber-reinforced thermoplastic polymer composition of the present invention can be a homopolymer or a copolymer, copolymer is defined herein as a polymer comprising the product of polymerization of more than one monomer, that is, two, three, four or more monomers. Preferably the thermoplastic polymer is a polyolefin (PO), for example a polypropylene (PP) or a polyethylene (PE), such as low density polyethylene (LDPE), linear low density polyethylene (LLDPE), ultra low density polyethylene (ULDPE), very low density polyethylene (VLDPE), high density polyethylene (HDPE); a polycarbonate (PC); an acrylonitrile and styrene copolymer (SAN); an acrylonitrile, butadiene, and styrene terpolymer (ABS), polymerized by bulk, mass or emulsion process; a polyvinyl chloride (PVC); a polyphenylene oxide (PPO); a polyamide (PA), for example Nylon 6 or Nylon 66; a polystyrene (PS), such as general purpose, high impact, atactic or syndiotactic; a polyester, such as polyethylene terephthalate (PET) or polybutylene terephthalate (PBT); polyphenylene sulfide (PPS) and blends thereof, for example thermoplastic polyolefin (TPO) such as PP/PE; PC/ABS; PPO/PS; PC/polyester; PA/PP; PA/PPO; PA/PO; and PO/PS.

The polypropylene suitable for use in this invention is well known in the literature and can be prepared by known techniques. In general, the polypropylene is in the isotactic form, although other forms can also be used (for example, syndiotactic and/or atactic). Preferably the polypropylene of the present invention is an isotactic polypropylene having a high degree of crystallinity. The polypropylene used for the present invention is preferably a homopolymer of polypropylene or a copolymer, for example, a random or block copolymer, of propylene and an alpha-olefin, preferably a $C_2$, or $C_4$ to $C_{20}$ alpha-olefin. The alpha-olefin is present in the polypropylene of the present invention in an amount of not more than 30 percent by mole, preferably not more than 20 percent, more preferably not more than 15 percent, even more preferably not more than 10 percent and most preferably not more than 5 percent by mole.

Examples of the $C_2$, and $C_4$ to $C_{20}$ alpha-olefins for constituting the propylene and alpha-olefin copolymer include ethylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene.

The melt flow rate (MFR) of the polypropylene useful in the present invention is generally equal to or greater than 1 gram/10 minutes (g/10 min.), preferably equal to or greater than 5 g/10 min., more preferably equal to or greater than 10 g/10 min., even more preferably equal to or greater than 15 g/10 min., and most preferably equal to or greater than 20 g/10 min. The melt flow rate for polypropylene useful herein is generally equal to or less than 100 g/10 min., preferably equal to or less than 80 g/10 min., more preferably equal to or less than 70 g/10 min., even more preferably equal to or less than 60 g/10 min., and most preferably equal to or less than 50 g/10 min. Unless otherwise stated, melt flow rate is determined according to ISO 1133 at 230° C. and an applied load of 2.16 kilogram (kg).

Part or all of the polypropylene of the present invention may be graft-modified. A preferred graft modification of the polypropylene is achieved with any unsaturated organic compound containing, in addition to at least one ethylenic unsaturation (for example, at least one double bond), at least one carbonyl group (—C═O) and that will graft to a polypropylene as described above. Representative of unsaturated organic compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, -methyl crotonic, and cinnamic acid and their anhydride, ester and salt derivatives, if any. Maleic anhydride is the preferred unsaturated organic compound containing at least one ethylenic unsaturation and at least one carbonyl group.

The unsaturated organic compound containing at least one carbonyl group can be grafted to the polypropylene by any known technique, such as those taught in U.S. Pat. Nos. 3,236,917; 5,194,509 and 4,905,541.

The unsaturated organic compound content of the grafted polypropylene is at least 0.01 weight percent, preferably at least 0.1 weight percent and most preferably at least 0.5 weight percent based on the combined weight of the polypropylene and organic compound. The maximum amount of unsaturated organic compound content can vary to convenience, but typically it does not exceed 10 weight percent, preferably it does not exceed 5 weight percent and most preferably it does not exceed 2 weight percent based on the combined weight of the polypropylene and the organic compound.

In general, the thermoplastic polymer is employed in an amount of at least 20 parts by weight, preferably at least 30 parts by weight, more preferably at least 40 parts by weight, most preferably at least 50 parts by weight based on the weight of the total composition. In general, the thermoplastic polymer is used in amounts less than or equal to 94 parts by weight, preferably less than or equal to 90 parts by weight, more preferably less than or equal to 80 parts by weight, even more preferably less than or equal to 75 parts by weight, and most preferably less than or equal to 70 parts by weight based on the weight of the total composition.

The elastomer component in the fiber-reinforced thermoplastic polymer composition of the present invention is defined as a material which experience large reversible deformations under relatively low stress. Elastomers are typically characterized as having structural irregularities, non-polar structures, or flexible units in the polymer chain. Preferably, an elastomeric polymer can be stretched to at least twice its relaxed length with stress and, after release of the stress, returns to approximately the original dimensions and shape. Some examples of commercially available elastomers include natural rubber, polyolefin elastomers (POE), chlorinated polyethylene (CPE), silicone rubber, styrene/butadiene (SB) copolymers, styrene/butadiene/styrene (SBS) terpolymers, styrene/ethylene/butadiene/styrene (SEBS) terpolymers and hydrogenated SBS or SEBS.

Preferred elastomers are polyolefin elastomers. Suitable polyolefin elastomers for use in the present invention comprise one or more $C_2$ to $C_{20}$ alpha-olefins in polymerized form, having a glass transition temperature ($T_g$) less than 25° C., preferably less than 0° C., more preferably less than −25° C. $T_g$ is the temperature or temperature range at which a polymeric material shows an abrupt change in its physical properties, including, for example, mechanical strength. $T_g$ can be determined by differential scanning calorimetry. Examples of the types of polymers from which the present polyolefin elastomers are selected include polyethylene and copolymers of alpha-olefins, such as ethylene and propylene (EPM), ethylene and 1-butene, ethylene and 1-hexene or ethylene and 1-octene copolymers, and terpolymers of ethylene, propylene and a diene comonomer such as hexadiene or ethylidene norbornene (EPDM).

A preferred polyolefin elastomer is one or more substantially linear ethylene polymer or one or more linear ethylene polymer (S/LEP), or a mixture of one or more of each. Both substantially linear ethylene polymers and linear ethylene polymers are well known. Substantially linear ethylene polymers and their method of preparation are fully described in U.S. Pat. No. 5,272,236 and U.S. Pat. No. 5,278,272 and linear ethylene polymers and their method of preparation are fully disclosed in U.S. Pat. Nos. 3,645,992; 4,937,299; 4,701,432; 4,937,301; 4,935,397; 5,055,438; EP 129,368; EP 260,999; and WO 90/07526.

The elastomer is employed in amounts of equal to or greater than 1 part by weight, preferably equal to or greater than 2 parts by weight, more preferably equal to or greater than 4 parts by weight, even more preferably equal to or greater than 6 parts by weight and most preferably equal to or greater than 10 parts by weight based on the weight of the fiber-reinforced thermoplastic polymer composition. In general, the elastomer is used in amounts less than or equal to 70 parts by weight, preferably less than or equal to 50 parts by weight, more preferably less than or equal to 40 parts by weight, even more preferably less than or equal to 30 parts by weight and most preferably less than or equal to 20 parts by weight based on the weight of the fiber-reinforced thermoplastic polymer composition.

The fabricated articles of the present invention comprise a fiber-reinforced thermoplastic polymer composition comprising a thermoplastic polymer, an elastomer, and a reinforcing fiber. Further, the fiber-reinforced thermoplastic polymer composition of the present invention may also (optionally) comprise one or more additional polymer and/or also (optionally) comprise one or more additives that are commonly used in thermoplastic compositions of this type. Additional polymers may be one or more of the thermoplastic polymers described hereinabove and may be the same or different from the thermoplastic polymer component of the fiber-reinforced thermoplastic polymer composition. Examples of typical additives are fillers, other than the reinforcing fiber component, such as, but not limited to talc, clay, wollastonite, mica, calcium carbonate or mixtures thereof; thermal stabilizers; ultra violet (UV) light stabilizers; coupling agents; colorants; antioxidants; antistats; mold release, clarifiers, nucleating agents, flame retardants, such as, but not limited to halogenated hydrocarbons, halogenated carbonate oligomers, halogenated diglycidyl ethers, organophosphorous compounds, such a mono-, di- or oligomeric phosphates, fluorinated olefins, antimony oxide and metal salts of aromatic sulfur, or a mixture thereof.

Depending on the additive and the desired effect, such additives may be present in an amount from at least 0.01 parts, preferably at least 0.1 parts, more preferably at least 1 part, more preferably at least 2 parts and most preferably at least 5 parts by weight based on the total weight of the composition. Generally, the additive is present in an amount less than or equal to 25 parts, preferably less than or equal to 20 parts, more preferably less than or equal to 15 parts, more preferably less than or equal to 12 parts, and most preferably less than or equal to 10 parts by weight based on the total weight of composition.

In the method of the present invention, any additional polymers and/or additives are preferably added together with the elastomer as a masterbatch. Masterbatch is defined as a mixture of two or more components. The components comprising the masterbatch may be combined in any suitable manner which results in adequate dispersion in the final fiber-reinforced thermoplastic polymer composition, for instance they may be dry blended and/or melt blended, they may be combined as powders and/or pellets, they may be added in their neat form and/or as a concentrate in a carrier, such as a thermoplastic polymer, wax or oil, or any combination(s) thereof. Preferably, the elastomer and at least half to all of the components (for example, additives), based on the total number of the other components, with the exception of most to all of the thermoplastic polymer component and the reinforcing fiber material, are added as a masterbatch. More preferably, the elastomer and at least ⅔ to all of the other components, with the exception of most to all of the thermoplastic polymer component and the reinforcing fiber material, are added as a masterbatch. Even more preferably, the elastomer and at least ¾ to all of the other components, with the exception of most to all of the thermoplastic polymer component and the reinforcing fiber material, are added as a masterbatch. Most preferably, the elastomer and all of the other components, with the exception of most to all of the thermoplastic polymer component and the reinforcing fiber material, are added as a masterbatch. In some cases it may be preferable to add up to 49 percent by weight of the thermoplastic polymer component into the masterbatch.

To illustrate the practice of this invention, examples of preferred embodiments are set forth below. However, these examples do not in any manner restrict the scope of this invention.

EXAMPLES

In the following examples, weight percent was based on the total weight of the fiber-reinforced propylene polymer composition.

An impact polypropylene and a masterbatch containing a polyolefin elastomer, sizing agent, and color concentrate were fed into and plasticized in a Dieffenbacher single screw extruder having a barrel temperature of about 240° C. to form a molten propylene polymer composition. The molten propylene polymer composition was conveyed into a Dieffenbacher twin-screw extruder where about 48 glass rovings (30 percent by weight) were introduced at the beginning of the conveyance and mixing zone which was set at about 210° C. As the fiber-reinforced molten propylene polymer composition was conveyed through the twin-screw extruder from the melt zone to the die zone, both set at 240° C., the continuous fibers were chopped to a desired length which ranged from 1 inch (2.54 centimeters) to 4 inches (10.16 centimeters). The twin-screws were run at 55 rotations per minute with a throughput rate of 300 pounds (136.08 kilograms) per hour.

The fiber-reinforced propylene polymer composition was extruded through a die forming a ribbon measuring about 7 inches (17.78 centimeters) wide by about 1.25 inches (3.18 centimeters) high. The molten ribbon was conveyed through a temperature controlled enclosure at 175° C. to a cutter via a first conveyer belt, the ribbon was cut into preforms, referred to as logs, and conveyed away from the cutter on a second belt in a temperature controlled enclosure set at 240° C. then via a third belt through a temperature controlled tunnel set at 200° C. to a compression mold. Three logs were required in the mold per molding cycle, the first and second log were about 28.5 inches (72.39 centimeters) long and the third log was about 5.9 inches (65.79 centimeters) long.

The logs were hand placed in the mold of a 3000 ton compression molding press having a cavity temperature of 180° C. and a core temperature of 170° C. The slow close time was about 9 seconds, tonnage time was about 1.5 minutes and the cure time was about 0.5 minute. The fabricated article was a vehicle underbody having a variable wall thickness between 0.125 inch (0.32 centimeter) to 0.2 inch (0.51 centimeter) measuring about 3.5 feet (1.07 meters) long by 2.5 feet (0.76 meter) wide and 2 feet (0.61 meter) deep and weighting about 19 pounds (8.62 kilograms).

The composition of Examples 1 to 4 are given in Table 1 (parts by weight are based on weight of the total composition). In Table 1:

"PP" is an impact polypropylene copolymer comprising about 12 percent ethylene and having a melt flow rate of 35 g/10 min., according to ISO 1133 at 230° C. and an applied load of 2.16 kg;

"POE" is a substantially linear ethylene polymer available as AFFINITY™ 8200 polyolefin elastomer from The Dow Chemical Company having a density of approximately 0.87 gram per square centimeter (g/cm2), a melt flow rate of 5 g/10 min. (according to ISO 1133 at 190° C. and an applied load of 2.16 kg), a molecular weight distribution of 2.1;

"Glass" is continuous glass fiber available as TUFROV™ 4588 from PPG having a Tex number of 2205 and a diameter of about 17 micrometers;

"Color" is a dark gray color concentrate available as Product Code 52480-HI from Americhem; and "SA" is a maleated polypropylene sizing agent available as POLYBOND™ 3200 from Crompton having a 1 to 1.5 percent maleic anhydride graft level.

The following tests are run on test specimens cut from the fabricated article and the test results are reported in Table 1:

Flexural properties, "$F_M$" (flexural modulus) and "$F_S$" (flexural strength), are run according to ISO 178 at 2 millimeter (mm) per minute a on a 0.2 inch (0.51 centimeter) by 1 inch (2.54 centimeters) by 8 inch (20.32 centimeters) specimen, value reported in mega Pascal (MPa);

Tensile properties, "$T_S$" (tensile strength) and "$T_E$" (tensile elongation at break), are run according to ISO 527 at 5 mm per minute on a 0.2 inch (0.51 centimeter) by 1 inch (2.54 centimeters) by 8 inch (20.32 centimeters) specimen, values are reported in MPa and percent, respectively;

Instrumented Dart Impact, "IDI", is run at 73° F. according to ISO 6603/2 at 4.4 meter per second (m/s) with a dart radius of 20 mm, a ring opening of 40 mm, no lubrication sample clamped pneumatically during impact with 40 mm ring identical to lower ring on a 3 inch (7.62 centimeters) by 3 inch (7.62 centimeters) specimens of 3, 4, and 5 mm thickness, value reported in Joules (J).

TABLE 1

|  | 1 | 2 | 3 | 4 |
| --- | --- | --- | --- | --- |
| Composition |  |  |  |  |
| PP | 67 | 65 | 63 | 61 |
| POE | 0 | 2 | 4 | 6 |
| Glass | 30 | 30 | 30 | 30 |
| Color | 2 | 2 | 2 | 2 |
| SA | 1 | 1 | 1 | 1 |
| Properties |  |  |  |  |
| $F_M$, MPa | 4760 | 5330 | 5000 | 4820 |
| $F_S$, MPa | 97 | 113 | 115 | 108 |
| $T_S$, MPa | 52 | 55 | 53 | 58 |
| $T_E$, percent | 1.4 | 1.6 | 1.4 | 1.5 |
| IDI @ 3 mm, J | 15 | 14 | 14 | 17 |
| IDI @ 4 mm, J | 18 | 20 | 22 | 24 |
| IDI @ 5 mm, J | 29 | 33 | 33 | 34 |

What is claimed is:

1. A method of making a fiber reinforced thermoplastic polyolefin (TPO) composition and forming a fabricated article therefrom comprising the steps of:

(1) introducing into an extruder a polyolefin polymer, (2) introducing into the extruder a masterbatch comprising a polyolefin elastomer, (3) plasticating the polyolefin polymer and the masterbatch in the extruder forming a molten thermoplastic polyolefin composition, (4) introducing a continuous reinforcing fiber material into the molten thermoplastic polyolefin composition, (5) extruding the molten fiber reinforced thermoplastic polyolefin composition through a die forming a continuous extrusion of heated fiber reinforced thermoplastic polyolefin composition having a desired cross-sectional shape, (6) conveying the continuous extrusion of heated fiber reinforced thermoplastic polyolefin composition to a cutter, (7) cutting the continuous extrusion into a plurality of preforms and (8) conveying the preforms away from said cutter into a compression mold, a vacuum forming mold or a thermoforming mold, and (9) forming a fabricated article comprising the fiber reinforced thermoplastic polyolefin composition.

2. The method as taught in claim 1 wherein the mold in step (iv) is a compression mold.

3. The method as taught in claim 1 wherein the extruder is a single screw extruder or a twin screw extruder.

4. The method as taught in claim 1 wherein the elastomer is a substantially linear ethylene polymer or a linear ethylene polymer comprising ethylene and a $C_3$ to $C_{20}$ alpha olefin.

5. The method as taught in claim 1 wherein the elastomer is a substantially linear ethylene polymer or a linear ethylene polymer comprising ethylene and an alpha olefin selected from the group consisting of propylene, butene, hexene or 1-octene.

6. The method as taught in claim 1 wherein the elastomer is a substantially linear ethylene polymer comprising ethylene and 1-octene.

7. The method as taught in claim 1 wherein the masterbatch further comprises talc, clay, wollastonite, mica, calcium carbonate, a thermal stabilizer, an ultra violet (UV) light stabilizer, a coupling agent, colorants, an antioxidant, an antistat, a clarifier, a nucleating agent, a flame retardant, or mixtures thereof.

8. The method as taught in claim 1 wherein the reinforcing fiber material is continuous glass fibers, carbon graphite fibers, polyester fibers, KEVLAR polyaramid fibers, hemp fibers, metal fibers or metal coated fibers.

9. The method as taught in claim 1 wherein the reinforcing fiber material is a plurality of continuous glass fibers.

10. The method as taught in claim 1 wherein the fabricated article is a vehicle bed liner; a vehicle instrument panel, a vehicle cowling, a vehicle fender, a vehicle panel, a vehicle body cover, a vehicle underbody, an electrical equipment device housing, a crate, lawn and garden furniture, a floor covering or a wall covering, wherein the vehicle is a car, a truck, a snow mobile, a personal water craft, an all terrain vehicle, a lawn and garden tractor, farm equipment or a golf cart.

11. The method as taught in claim 1 wherein the fabricated article is a golf cart underbody.

* * * * *